(No Model.)
A. H. BARTHOLD.
DISH HANDLE AND SUPPORT.
No. 511,189. Patented Dec. 19, 1893.
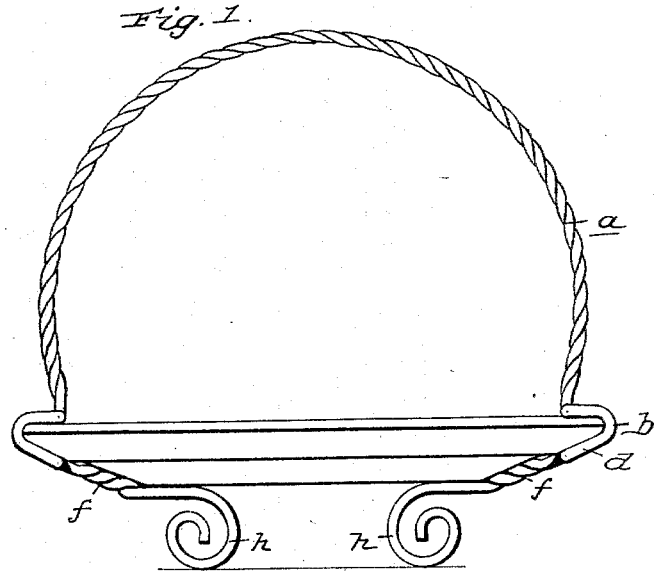
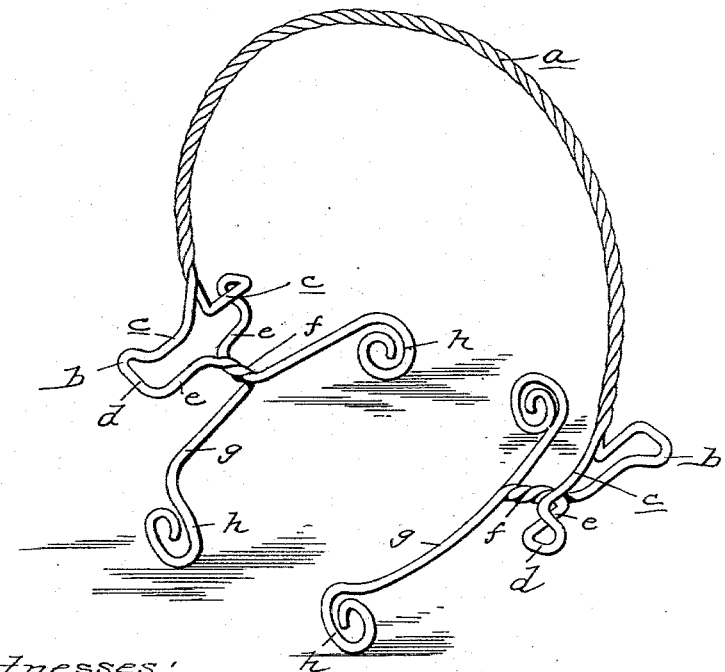

UNITED STATES PATENT OFFICE.

ALLEN H. BARTHOLD, OF PHILADELPHIA, PENNSYLVANIA.

DISH HANDLE AND SUPPORT.

SPECIFICATION forming part of Letters Patent No. 511,189, dated December 19, 1893.

Application filed May 17, 1893. Serial No. 474,586. (No model.)

*To all whom it may concern:*

Be it known that I, ALLEN H. BARTHOLD, a citizen of the United States, residing at Philadelphia, in the county of Philadelphia and State of Pennsylvania, have invented certain new and useful Improvements in Dish Handles and Supports; and I do declare the following to be a full, clear, and exact description of the invention, such as will enable others skilled in the art to which it appertains to make and use the same.

This invention has relation to an improvement in detachable and adjustable handles and supports for plates or dishes, and among other things it has for its object to improve such devices whereby a hot plate or plate containing hot material or cool, may be conveniently carried, and supported at any suitable place, such as on a table, without having the heated dish or plate come in contact with the table.

A further object of the invention is to adapt the device for grasping a plate or dish, and supporting the same, so that an ordinary plate may be converted into an ornamental dish with a handle for carrying or moving the same about.

Other objects and advantages will appear from the following description and claims when taken in connection with the annexed drawings, in which—

Figure 1, is a view of my improved device in side elevation, illustrating a dish therein, and Fig. 2, is a perspective view of my improved device with the dish removed.

In carrying out my invention, I take two pieces of spring metal or other suitable material, and preferably steel, spring wire, of a sufficient length, and after twisting or wrapping them together for a sufficient distance intermediate of their length, I bow or bend them in U-shape so as to form an ornamental handle $a$. At the terminus of the twisted or bent ends, I form clamps $b$, by carrying the branches $c$, of each wire horizontally in opposite directions; I then loop them outwardly and inwardly as shown at $d$, after which they are again carried horizontally toward each other so as to form branches $e$, which are parallel or approximately so with the branches $c$, after which the meeting ends are wrapped as shown at $f$, and are carried downwardly and inwardly oblique, so as to conform to the curve or bulge on the under side of a plate or dish. The branches of the wires are then carried off in opposite directions in a curvilinear manner as shown at $g$, when they are formed at their extreme ends into legs or supports $h$, by one or more vertically disposed whirls or coils. These legs depend from the ends of the branches $g$, so that the entire device in resting upon such legs or supports will assume a position sufficiently elevated from the table top or other article upon which it may be placed to keep a hot plate or dish from coming in contact therewith.

In applying this device to a dish, it is simply necessary to spring apart the clamps, and place a dish or plate, upon the branches $g$, when the resiliency of the bail or handle will be sufficient to close the clamps upon the dish when the operator releases his grasp, and the clamps will receive the edge of the dish as better shown in Fig. 1, of the drawings. By having the clamps broad as shown, and the branches $g$, with the legs on the end extending well around the dish, it will be seen that a very firm support will be given.

While I have described specifically and in detail, the construction precisely as shown, yet I do not wish to be understood as limiting myself to such exact construction, as I am aware that some of the parts will permit of modifications and change in form, without departing from the spirit of my invention.

Having described my invention, what I claim is—

1. The improved handle and dish support formed from wire twisted together and bent to form a vertically-disposed handle, the wires each having a lateral loop to receive the edge of a dish and arranged on opposite sides of said vertical handle, said wires being twisted together at $f$, and having their ends extended curvilinearly in opposite directions so as to present an expanded base or seat for the dish, and terminating in depending legs, substantially as specified.

2. The improved removable handle and dish support described, formed from two pieces of spring wire twisted together and bent to form the bail or handle $a$, and having the clamp adapted to receive the edge of a dish, formed at the ends of the bail, and each wire terminating in the curvilinear branches $g$, and the legs $h$, to receive and sustain a dish, substantially as specified.

In testimony whereof I affix my signature in presence of two witnesses.

ALLEN H. BARTHOLD.

Witnesses:
H. A. DARBY,
CHARLES ZANES.